Feb. 23, 1965 R. WICK 3,170,367
PHOTOGRAPHIC ENLARGER
Filed May 10, 1961 3 Sheets-Sheet 2

INVENTOR.
RICHARD WICK
BY
Michael S. Striker
Attorney

Feb. 23, 1965   R. WICK   3,170,367
PHOTOGRAPHIC ENLARGER

Filed May 10, 1961   3 Sheets-Sheet 3

INVENTOR.
RICHARD WICK
BY

United States Patent Office

3,170,367
Patented Feb. 23, 1965

3,170,367
PHOTOGRAPHIC ENLARGER
Richard Wick, Grunwald, near Munich, Germany, assignor to Agfa Aktiengesellschaft, Leverkusen-Bayerwerk, Germany
Filed May 10, 1961, Ser. No. 109,113
7 Claims. (Cl. 88—24)

The present invention relates to photographic enlargers.

It is highly desirable to equip photographic enlargers with devices which will automatically determine the exposure of the printing paper. For example, there are known entirely closed units which will make photographic reproductions on rolls of printing paper, and the operation is more or less fully automatic, but such enlargers are not capable of providing a wide variation in the sizes of the prints and are almost always limited to a print of a predetermined width. Of course, it is possible to have an extremely wide range of sizes in the photographic reproductions where the photographic enlarger is of the type which has a support on which the printing paper is placed with a lamp located over the support to direct the exposing light through a negative, for example, onto the printing paper. While this latter type of enlarger permits the widest possible variety of sizes of photographs to be obtained, it does not lend itself conveniently to automatic operation with the known devices for accomplishing this result. For example, one of the known assemblies for measuring the exposure light and automatically setting the enlarger is placed on the support for the printing paper, but this known assembly is limited to one size, so that the advantages of the wide variety of sizes of reproductions is necessarily lost. There are adapters which may be used with such devices so as to adapt them for reproductions of different sizes, but this requires one device to be placed on top of another device and there is an extremely inconvenient arrangment of adjustments which must be carried out with such devices as well as the inconvenience of connecting adapters and the like and arranging all of the various components so as to produce the desired automatic operation. Also, there are devices which can be placed on the support for the printing paper and which will measure the reflected light so as to use the reflected light for automatic setting of the enlarger, but these devices on one hand take up an undesirably large amount of space so that they do not permit reproductions of the size which can be obtained from the same support without the use of the automatic assembly, and in addition these devices can only measure light reflected from an edge portion of the reproduction where a relatively large reproduction is being made. Furthermore, the operator can only estimate from which part of the image the light is being measured so that the operator cannot be sure of whether the automatic setting is being obtained with the most important part of the image.

It is accordingly a primary object of the present invention to provide a photographic enlarger which on the one hand will enable the widest possible variety of sizes of the photographic reproductions to be made which on the other hand will provide automatic operation of the enlarger without the above disadvantages of taking up space on the support for the printing paper or providing uncertainty as to which part of the image is being used to determine the automatic settings, or of being compelled to use light from an edge of the image where a relatively large reproduction is being made. Also, with the arrangement of the invention the use of adapters and the like are completely avoided.

It is also an object of the present invention to provide in a photographic enlarger an automatic means for operating the enlarger, which at the same time will give to the operator an exact indication of which part of the light is being used to determine the setting of the enlarger so that there will be no uncertainty.

A further object of the present invention is to provide a photographic enlarger of the above type with a means for measuring the light which will be used for the photographic reproduction and which will also enable the operator to quickly and easily shift the light-measuring means to any selected part of the image which is to be reproduced.

It is furthermore an object of the present invention to provide for a photographic enlarger an automatic structure for measuring the light and controlling the operation of the enlarger, this automatic device being capable of being used either with that type of enlarger which has its own stand or that type of enlarger which is placed on a table.

An additional object of the present invention is to provide for a photographic enlarger an automatic control system which permits the control unit itself, as distinguished from the light-measuring unit, to have any one of a wide variety of locations according to the convenience of the operator and the particular circumstances under which the enlarger is used.

The objects of the present invention also include the provision of a photographic enlarger capable of accomplishing all of the above objects and at the same time composed of simple rugged elements which are very reliable in operation.

With the above objects in view the invention includes, in a photographic enlarger, a support for a light-sensitive printing paper, this support having a transparent portion. In accordance with the present invention there is located beneath the transparent portion a light-measuring means which will measure at least part of the light passing through the transparent portion of the support and this light-measuring means forms part of a device for automatically controlling the enlarger.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
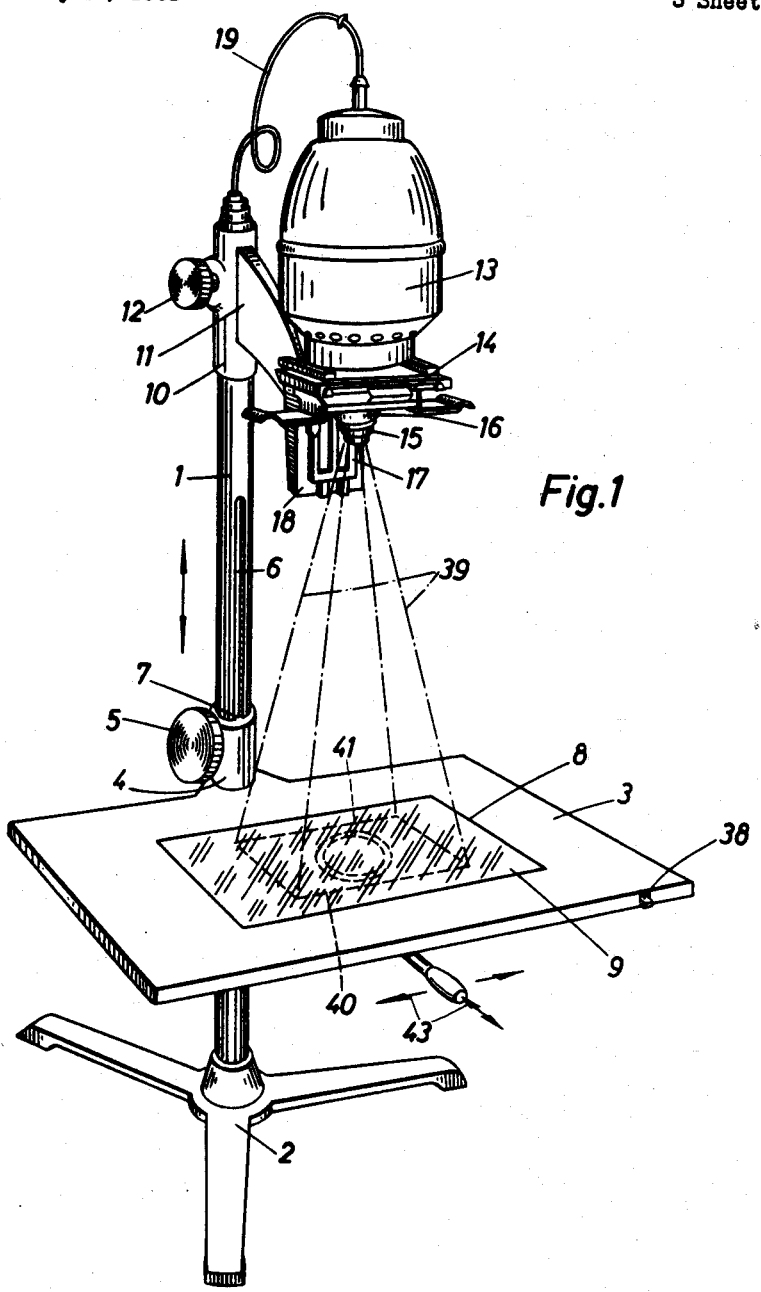
FIG. 1 is a perspective illustration of a photographic enlarger which is provided with the structure of the invention.

Referring to FIG. 1, the photographic enlarger illustrated therein includes a column 1 of a stand which includes the base 2 which carries the vertical column 1. The column 1 carries a support 3 for the light-sensitive printing paper, and the support 3 is fixed to a sleeve 4 through which the column 1 freely passes, so that the sleeve 4 together with the support 3 may be moved along the column 1 to an elevation which is convenient for the operator. A manually operable clamping means 5 is carried by the sleeve 4 and cooperates with the column 1 for releasably clamping the sleeve 4 together with the support 3 at a selected elevation along the column 1. The clamping means 5 may take any suitable form. For example it may be a simple set screw arrangement, or the element 5 may operate a gripping device which grips the column 1 in order to releasably maintain the support 3 at the selected elevation. In order to prevent rotary movement of the support 3 with respect to the column 1, the column 1 is formed with an axially extending groove 6 which receives the key 7 which is fixed to the sleeve 4, so that the key 7 is at all times located within the groove 6 and thus rotary movement of the board or support 3 with respect to the column 1 is prevented.

The support 3 is provided with a rectangular opening 8 in which is located a transparent plate 9 which is fixedly carried by the support 3 in the opening 8 thereof, and thus the support 3 is provided with the transparent portion 9. This transparent portion 9 of the support 3 may be made of transparent glass, for example, and the upper surface of the transparent portion 9 is flush with the upper surface of the remaining part of the support 3 which surrounds transparent portion 9 thereof, so that the support provides a smooth uninterrupted upper surface which is available to the operator to have the printing paper placed thereon.

At the upper end portion of the column 1 is located a sleeve 10 through which the column 1 also freely passes, and the sleeve 10 fixedly carries a hollow elongated arm 11. The sleeve 10 carries an unillustrated key similar to the key 7 and also located in an unillustrated vertically extending groove formed at the exterior surface of the column 1, so that the arm 11 and the sleeve 10 also are incapable of turning with respect to the column 1 while being vertically adjustable therealong. For this purpose the sleeve 10 carries a manually operable clamping means 12 which may be identical with the clamping means 5. If desired, instead of a manually operable clamping means, the element 12 may be replaced by a hand wheel which drives a suitable self-winding transmission which cooperates with a rack carried by the column 1 so that in this way it is also possible to adjust the elevation of the sleeve 10 and the arm 11 with respect to the column 1. Of course, it is also possible to use an electrical adjusting structure.

The arm 11 carries the illuminating assembly 13 in which is housed the lamp for providing the light which exposes the printing paper. The illuminating head 13 of the enlarger carries the support 14 for the negative, transparency, or the like which carries the image which is to be reproduced on the printing paper, and of course the light from the illuminating means 13 passes through the negative or the like which is carried by the support 14. Below the support 14 is located the objective 15 which is connected with the assembly by way of a light-tight bellows 16, although any other type of extensible and contractable means which is light-tight may be provided for connecting the objective with the support 14 so that the light from the lamp assembly 13 will pass through the negative or the like carried by the support 14 and then through the objective to be projected onto support 3 or the printing paper carried thereby. In order to adjust the objective 15 for focusing purposes, the objective 15 is fixedly carried by a carriage 17 which is vertically movable and which is guided for movement by a guide means 18. For example, the carriage 17 which carries the objective 15 is provided at its rear surface with dovetail grooves receiving dovetail projections of the guide means 18, these projections being in the form of ribs which extend parallel to the column 1, so that the objective 15 is in this way adjustable for focusing purposes. The arm 11 carries in its interior a known and therefore unillustrated transmission which cooperates with the carriage 17 for determining the elevation thereof so as to control the elevation of the objective 15 for focusing purposes. For example, an elongated element may have its lower end connected with the support 3 and may have its upper end extending into the hollow arm 11 and connected within the latter to a cam drive which controls the position of the carriage 17 and thus of the objective 15 so that when the height of the arm 11 and the structure carried thereby with respect to the support 3 is adjusted the objective will be automatically focused. In any event, the objective 15 can only move along a line which is parallel to the column 1. In other words the optical axis of the objective 15 is parallel to the column 1, and the objective 15 can only move along its optical axis, this optical axis always intersecting the transparent portion 9 at precisely the same point irrespective of the setting of the objective. The column 1 is hollow so that the flexible electrical conductor 19 can pass therethrough and be connected with the lamp within the housing 13. The conductor 19 serves in a manner described in greater detail below to connect the lamp to the automatic control device which automatically controls the intensity and duration of illumination of the lamp within the housing 13, this automatic control device being omitted from FIG. 1.

Figure 2:
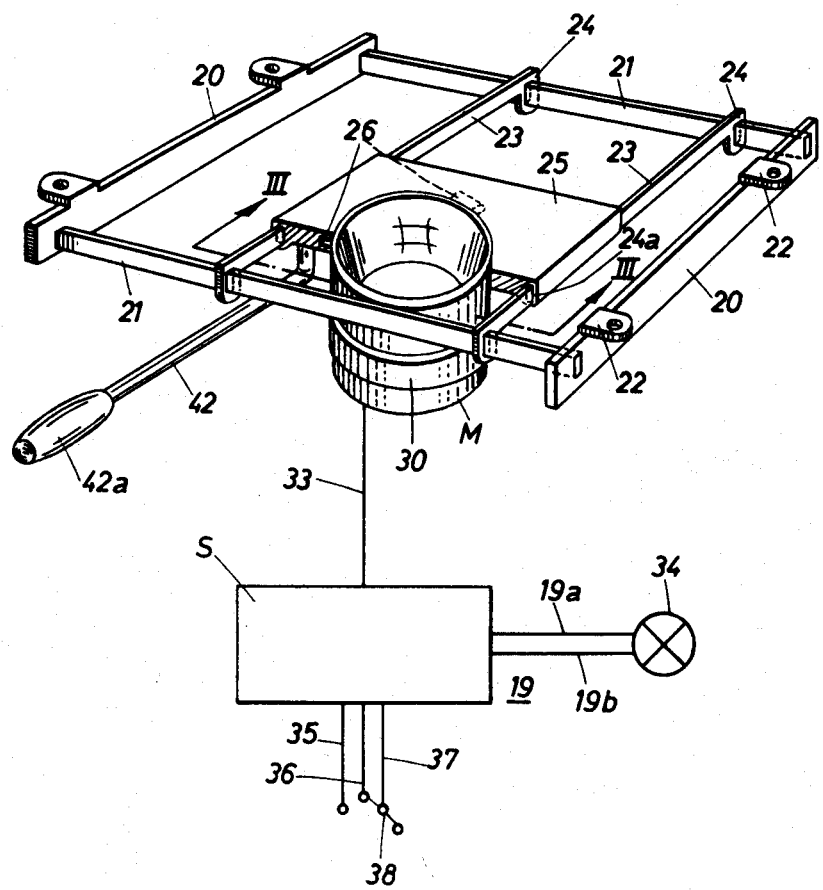
FIG. 2 is a partly diagrammatic perspective illustration of the structure of the present invention, FIG. 2 illustrating the structure which is located directly beneath the support of FIG. 1.
Figure 3:
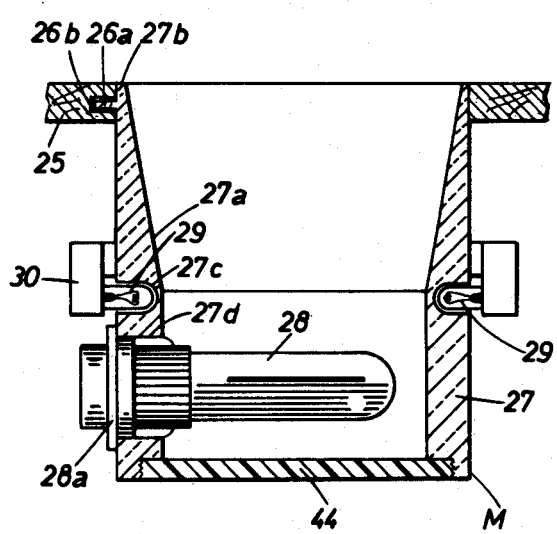
FIG. 3 shows in an enlarged, sectional elevation the construction of the light-measuring means of the invention.
Figure 4:
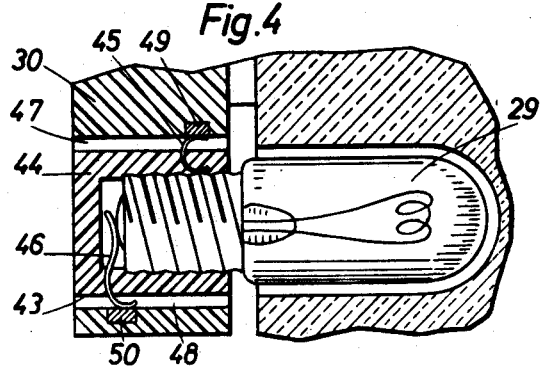
FIG. 4 is a fragmentary sectional illustration on an enlarged scale of a lamp mounting.

In accordance with the present invention there is located beneath the transparent portion 9 of the support 3 a light-measuring means which is described below, and this light-measuring means is supported beneath the transparent portion 9 by a carriage means which enables the light-measuring means to be moved in two mutually perpendicular directions parallel to the transparent portion 9 so that it is possible for the operator to locate the light-measuring means at any selected part of the transparent portion 9 at the underside thereof. This means which supports the light-measuring means for movement includes a pair of parallel cross members 20 (FIG. 2) and a pair of parallel longitudinally extending members 21, the latter being connected to the members 20, so that the elements 20 and 21 cooperate together to form a rectangular rigid frame. It will be noted that the bars or rails 21 are narrower than the bars 20. Each bar 20 is provided with a pair of lugs 22 at its upper edge, and these lugs 22 are formed with bores through which, for example, screws may pass for fastening the bars 20 to the underside of the board or support 3, the distance between the bars 20 being greater than the length of the transparent portion 9 so that the bars 20 would be located beyond the transparent portion 9. If desired the support 3 may fixedly carry at its underside elongated members provided with grooves or the like for receiving the lugs 22, so that in this way the frame 20, 21 can simply be slipped onto the supporting structure which is located at the underside of the support 3. A pair of parallel cross rails 23 extend parallel to the cross bars 20 and are formed at their ends with openings 24 through which the longitudinally extending rails 21 freely pass, so that each of the cross rails 23 is longitudinally movable along the rails 21. A carriage 25 is formed at its ends with elongated cutouts 24a through which the cross rails 23 freely pass, so that the carriage 25 determines the distance between the cross rails 23 and at the same time these cross rails support the carriage 25 for movement between the longitudinal rails 21. At the same time the entire unit formed by the carriage 25 and the rails 23 are movable longitudinally along the rails 21 between the cross bars 20, so that this construction provides a cross-carriage means which enables the carriage 25 to be located at any selected position within the area included by the frame 20, 21. The elements 21 are spaced from each other by a distance greater than the width of the transparent portion 9 and are located beyond the latter, so that with this arrangement it is possible to locate the carriage 25 at any selected part of the transparent portion 9 of the support 3. The carriage 25 which is located directly next to the underside of the transparent portion 9 directly carries the light-measuring means M of the invention. Thus, with the structure of the invention the light-measuring means is supported directly beneath the transparent portion 9 to measure at least part of the light passing therethrough, and it is possible to locate the light-measuring means M at any selected part of the transparent portion 9. The light-measuring means M includes a cylindrical housing 27 made of a synthetic resin which has the properties of glass. The housing 27 is made of a synthetic glass-like material which is transparent. At its bottom end the cylindrical housing 27 is closed by an opaque cover 44. The top end of the cylindrical housing 27 is rendered light-permeable either by being open, as shown in FIGS. 2 and 3, or by being provided with a transparent cover. A bayonet connection 26 serves to releasably connect the housing 27 to the carriage 25. For example, the carriage 25 may be provided, as shown in FIG. 3, with the bayonet openings 26b which respectively receive the bayonet projections 26a carried by the housing 27 at its exterior upper portion. As is particularly apparent from FIG. 3, the upper inner surface portion 27a of the housing 27 is frustoconical and diverges upwardly toward the support 9. As a result, there remains at the upper end of the housing 27 a relatively narrow annular surface portion 27b. Between its top and bottom ends, the housing 27 is formed at its exterior with an annular groove 27c which receives a plurality of lamps in the form of electric light bulbs 29, these lamps being carried by the annular member 30 which is electrically connected to a suitable source of electricity and through a circuit which includes a suitable switch so that the lamps 29 can be illuminated and extinguished, particularly in a manner described below. As is apparent from FIG. 4, each lamp 29 is received in a socket 44, and the member 30 is formed with a plurality of bores 43 which respectively receive the sockets 44 which respectively receive the lamps 29. The member 30 is formed at opposed parts of each bore 43 with grooves 47 and 48, respectively, and these grooves respectively receive the free ends of leaf springs 45 and 46 which are carried by the socket 44 and contact the lamp 29 in the manner shown in FIG. 4. The springs 45 and 46 respectively engage the electrically conductive bars 49 and 50 which are annular and coaxially embedded in the member 30 and which are electrically connected into the circuit described below for conveying electrical current through the several lamps 29. The annular member 30 may be carried by the lamps 29 which are located in the groove 27, or the member 30 may be supported in any suitable way on the housing 27 or directly from the carriage 25 through a suitable bracket or the like. The housing 27 is formed beneath the annular groove 27c with an opening 27d which passes through the wall of the housing 27, and this opening 27d receives the socket 28a of a photocell 28 which is located in the interior of the housing 27, as shown in FIG. 3. The inner and outer surfaces of the cylindrical housing 27 are covered with a light-reflecting, matted coating in the form of a suitable lacquer or the like, so that on the one hand the greatest part of the light which enters into the housing 27 will be reflected to the photocell 28 to be measured thereby, and on the other hand when the lamps 29 are illuminated there will appear through the transparent portion 9 a ring 41 which is produced by the light shining upwardly through the end face 27b of the housing 27. Thus, whenever the lamps 29 are illuminated the light which passes through the transparent portion 9 from the end face 27b of the housing 27 produces the ring of light 41 which indicates very clearly to the operator precisely where the measuring means M is located, even though the measuring means M is located beneath the portion 9 of the support 3. Thus, the lamps 29 together with the wall of the housing 27 which is provided at its inner and outer surfaces with the above coating forms an indicating means which will indicate, by way of the ring of light 31, precisely where the measuring means M is located.

The light-measuring means M forms part of a device for automatically determining or controlling the exposure of the printing paper which is placed on the support 3, and according to the invention the light-measuring means M is connected through the flexible conductor 33 (FIG. 2) to the control assembly S which forms the control assembly of the photoelectric control device for automatically determining the exposure of the printing paper. The lead or conductor 19 shown at the upper part of FIG. 1 includes the pair of conductors 19a and 19b which interconnect the lamp 34 within the housing 13 with the control unit S. The structure includes three additional conductors or leads 35, 36 and 37 which interconnect the unit S with a switch 38 for illuminating and extinguishing the examining light which is used to set the enlarger up before the actual exposure of the printing paper is made. The switch 38 which is shown at the lower part of FIG. 2 is turnable between a pair of end positions. At one of its end positions the switch 38 will energize the lamp so as to provide the examining light, and in the other end position the switch 38 will start the actual exposure of the printing paper. The photoelectric control device which includes light measuring means M and the control assembly S automatically determines the intensity and duration of illumination of the projection lamp 34. With this arrangement according to which the switch 38, whose position in the actual apparatus as shown in FIG. 1, and the light-measuring means M are connected through flexible conductors with the unit S which is also connected through flexible conductors with the lamp 34, this unit or assembly S can be located at any desired part of the enlarger. For example, it may be located beneath the support 3 or it may be located adjacent to the support 3 on any suitable carrier. Thus, it is unnecessary to place the unit S on top of the support 3 where it will occupy space which otherwise might be occupied by the printing paper itself, and it is apparent, therefore, that with the structure of the invention the entire support 3 may be used for printing paper so that the size of the photographic reproductions is limited only by the dimensions of the support 3 itself. The control unit S itself does not form part of the present invention. For example, this control unit may have the construction which is shown in Austrian Patent 206,750.

According to the invention, and with the particular embodiment shown in the drawings, when the switch 38 has the position shown in FIG. 2 closing the circuit between the conductors 36 and 37, the examining light will provide the rays 39 shown in FIG. 1 for producing on the board 3 an image which can be examined by the operator so as to contribute to the making of the best possible print, and the circuit which is closed through the conductors 36 and 37 serves simultaneously to close the circuit of the lamp 29, so that simultaneously with the examining light 39 projected down onto the support 3 there is the ring of light 41 which indicates to the operator where the measuring means M is located. The examining light 39 provides on the board or support 3 an image 40 of the subject which is carried by a negative or the like supported by the support 14 in a conventional manner. Thus, the operator may see in this way the image which will be reproduced on the photographic paper when the latter is positioned on the support 3 and exposed.

Because the focusing drive acts on the objective 15 to move the latter only along its optical axis, the center of the field which is to be photographed remains unchanged even though the degree of enlargement changes. Thus, if it is desired to measure only light which passes through the center of the image the light-measuring means M can remain at all times at a position where the axis of the housing 27 coincides with the optical axis of the objective 15. However, it may happen that the most important part of the image is not located at the center thereof, and in this event the carriage 25 may be shifted together with the light-measuring means M to any desired part of the transparent portion 9 of the support 3 so as to receive the light which passes through the most important part of the image, and in this way it is possible for the operator to provide for the enlarger controls which while being automatic are nevertheless influenced by the most important part of the image.

In order to shift the carriage 25 an elongated member 42 is connected to the carriage 25, and this elongated member 42 has a handle 42a accessible to the operator so that the member 42 together with the carriage 25 can be moved in mutually perpendicular directions, as indicated by the arrows 43 in FIG. 1. The element 42 is shown extending toward the operator in the drawings only for the sake of clarity. This manually engageable means 42 which is connected to the cross-carriage means for actuating the latter can of course be located at any desired location and extend in any desired direction. In particular, the elongated bar 42 may extend laterally from the carriage 25 rather than forwardly therefrom, and also the bar 42 can be swingably connected to the carriage 25 so that when the latter is not moved the bar 42 may extend vertically down from the carriage 25 and be located out of the way. The board or support 3 may carry at its underside a suitable eye or the like through which the element 42 extends so as to be supported in a suitable position. Of course, all of the above description applies to a photographic enlarger of the type shown in FIG. 1 which has its own stand. However, the invention is equally applicable to an enlarger which is set on a table or the like, the only requirement being that in this event the support 3 form the upper part of a hollow box or the like so that the light-measuring means M can be located in such a hollow box directly beneath the support 3 in the manner described above. Of course, with such an arrangement the box whose top wall is formed by the support 3 has a side wall formed with a circular opening or the like through which the bar 42 extends so as to be accessible to the operator for selecting the position of the light-measuring means M. Instead of a bar 42 it is possible to provide an elongated shaft turnably carried by the bar or bars 23 and carrying a pinion which meshes with a rack fixed to the underside of the carriage 25, such a shaft extending perpendicularly with respect to the bar 23 and carrying at a point accessible to the operator a hand wheel so that the operator may turn such a shaft to cause the pinion to cooperate with the rack for shifting the carriage 25 along the cross rails 23. Such a shaft would be prevented from shifting axially, so that when the operator moves the shaft axially the entire assembly formed by the carriage 25 and the rails 23 would move longitudinally of the longitudinal rails 21.

The diameter of the housing 27 is such that when the smallest size of a photographic reproduction is being made the photographic reproduction will not be smaller than the diameter of the housing 27, while at the same time even when the largest enlargements are being made the housing 27 will receive light which passes through a selected part of the transparent portion 9.

Of course, the above-described indicating means which provides an illuminating ring 41 or the like which indicates the location of the light-measuring means and which energizes the indicating means simultaneously with the energizing of the examining light can be used with photographic enlargers whose control devices and even light-measuring constructions differ from those described above. In almost all cases the measuring device M will remain aligned with the central portion of the image. Nevertheless it can be quickly and easily moved to any desired other part of the image which may be more important than the central portion thereof. Thus, with the structure of the invention the speed of operation of the enlarger and the accuracy of operation thereof are greatly increased. All that is required is for the operator to switch on the examining light so as to determine whether the light which passes through the most important part of the image reaches the light-measuring means, and if these conditions are met the switch 38 need only be moved to its opposite end position in order to start the exposure of the printing paper.

It will be noted that the above-described structure of the invention may easily be incorporated into existing conventional enlargers without in any way requiring remodeling or redesigning or reconstruction of the conventional structure thereof.

It will be understood that each of the elements described above, or two or more together, may also find a useful application in other types of photographic enlargers differing from the types described above.

While the invention has been illustrated and described as embodied in automatic photographic enlargers, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a photographic enlarger, in combination, a support having a surface adapted to receive an image to be observed at said surface by the operator and then reproduced on light-sensitive printing paper carried by said surface, said support having a transparent portion; light-measuring means located adjacent said transparent portion at the side of said support opposite from said surface thereof for measuring at least part of the light passing through said transparent portion of said support to said opposite side thereof, said light-measuring means forming part of a photoelectric control device for controlling the exposure of the printing paper; and indicating means carried by said light-measuring means for indicating at said surface of said transparent portion of said support the part of said transparent portion through which light passes to be measured by said light-measuring means.

2. In a photographic enlarger, in combination, a support having a surface adapted to receive an image to be observed at said surface by the operator and then reproduced on light-sensitive printing paper carried by said surface, said support having a transparent portion; light-measuring means located adjacent said transparent portion at the side of said support opposite from said surface thereof for measuring at least part of the light passing through said transparent portion of said support to said opposite side thereof, said light-measuring means forming part of a photoelectric control device for controlling the exposure of the printing paper; and illuminating means carried by said light-measuring means to illuminate part of said transparent portion for indicating at said surface of said support that part of said transparent portion through which light passes to be measured by said light-measuring means.

3. In a photographic enlarger, in combination, a support having a surface adapted to receive an image to be observed at said surface by the operator and then reproduced on light-sensitive printing paper carried by said surface, said support having a transparent portion; light-measuring means located adjacent said transparent portion at the side of said support opposite from said surface thereof for measuring at least part of the light passing through said transparent portion of said support to said opposite side thereof, said light-measuring means forming part of a photoelectric control device for controlling the exposure of the printing paper; illuminating means carried by said light-measuring means to illuminate part of said transparent portion for indicating at said surface of said support that part of said transparent portion through which light passes to be measured by said light-measuring means; and switch means operatively connected with said control device and said illuminating means for energizing said illuminating means only when the control device is unenergized.

4. In a photographic enlarger, in combination, a support having a surface adapted to receive an image to be observed at said surface by the operator and then reproduced on light-sensitive printing paper carried by said surface, said support having a transparent portion; light-measuring means located adjacent said transparent portion at the side of said support opposite from said surface thereof for measuring at least part of the light passing through said transparent portion of said support to said opposite side thereof, said light-measuring means forming part of a control device for controlling the exposure of the printing paper; illuminating means carried by said light-measuring means for illuminating at said surface of said support that part of said transparent portion through which light passes to said light-measuring means to be measured thereby, so that said illuminating means indicates the part of said transparent portion through which light passes to said light-measuring means; and switch means for switching on an examining light which is projected onto said support at least said transparent portion thereof, said switch means being operatively connected to said illuminating means for energizing the latter simultaneously with the switching on of the examining light and for deenergizing said illuminating means simultaneously with the switching off of the examining light.

5. In a photographic enlarger, in combination, a support having a surface adapted to receive an image to be observed at said surface by the operator and then reproduced on light-sensitive printing paper carried by said surface, said support having a transparent portion; a cylindrical housing located directly adjacent said transparent portion at the side of said support opposite from said surface thereof and having a light-permeable end adjacent said transparent portion so that light passing through the latter will enter through said light-permeable end into said cylindrical housing, said housing having distant from said transparent portion an opaque end; and means located in said housing for measuring light which enters the same through said light-permeable end thereof, said housing having a cylindrical wall which is light-permeable and carrying at its interior a light-reflecting layer for reflecting light to said light-measuring means, and said housing carrying a means for illuminating said cylindrical wall thereof so as to provide a ring of light at the end of said housing next to said transparent portion and visible through the latter at said surface of said support so that the operator when looking at said surface of said support will know where said housing is located.

6. In a photographic enlarger, in combination, a support having a surface adapted to receive an image to be observed at said surface by the operator and then reproduced on light-sensitive printing paper carried by said surface, said support having a transparent portion; a hollow cylindrical housing made of a transparent material and having one end located next to said transparent portion adjacent the latter at the side of said support opposite from said surface thereof, said one end of said housing being light-permeable and opaque means closing the opposite end of said housing, said housing carrying in its interior a photoelectric means and said housing carrying at its inner and outer surfaces a coating of opaque, light-reflecting material so that light can pass only through the annular end of said housing next to said transparent portion of said support, said housing being formed between its ends and at its exterior with an annular groove; and lamp means in said groove so that when said lamp means is illuminated light will pass through the wall of said housing and out of said annular end thereof through said transparent portion of said support to provide a ring of light at said transparent portion visible at said surface of said support and indicating the location of said housing.

7. In a photographic enlarger, in combination, a support having a surface adapted to receive an image to be observed on said surface by an operator and then reproduced on light sensitive printing paper, said support having a transparent portion; projecting means above said surface for projecting an image onto said surface; light measuring means located beneath said transparent portion of said support for measuring at least part of the light passing therethrough, said light measuring means forming part of a photoelectric control device connected to said projecting means for controlling the exposure of the printing paper; carriage means supporting said light measuring means for movement in a pair of mutually perpendicular directions parallel to said transparent portion for positioning said light measuring means in a selected position beneath said transparent portion; illuminating means carried by said light measuring means for illuminating at said surface of said support that part of said transparent portion through which light passes to said light measuring means in said selected position; and switch means operatively connected with said control device and said illuminating means for energizing said illuminating means only when said control device is unenergized.

References Cited by the Examiner
UNITED STATES PATENTS

| | | | |
|---|---|---|---|
| 2,201,606 | 5/40 | Bing | 88—23 |
| 2,444,675 | 7/48 | Rath | 88—24 |
| 2,668,474 | 2/54 | Rogers | 88—24 |
| 2,800,834 | 7/57 | Petry et al. | 88—24 |
| 2,853,921 | 9/58 | Biedermann et al. | 88—24 |
| 2,990,757 | 7/61 | Ponsar. | |
| 3,011,396 | 12/61 | Szymczak | 88—24 |

NORTON ANSHER, *Primary Examiner.*

EMIL G. ANDERSON, *Examiner.*